March 12, 1957 — L. A. SCHUMAKER — 2,785,002
SAFETY FRAME AND TOP FOR TRACTOR
Filed July 26, 1954 — 2 Sheets-Sheet 1
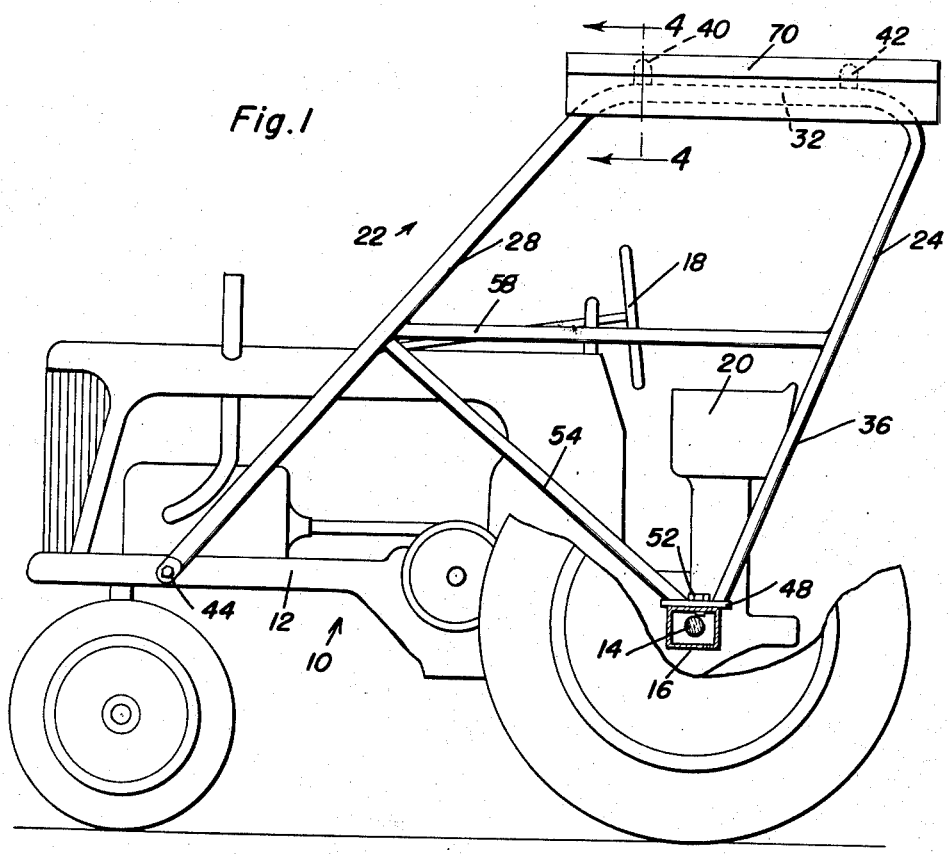
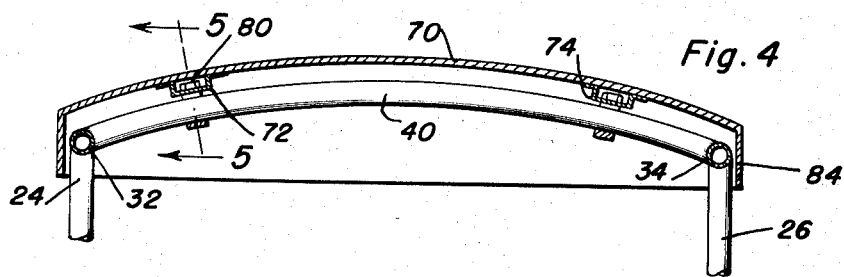
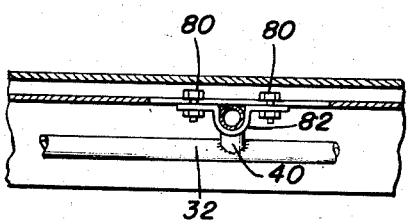
Lawrence A. Schumaker
INVENTOR.

March 12, 1957　　　L. A. SCHUMAKER　　　2,785,002
SAFETY FRAME AND TOP FOR TRACTOR
Filed July 26, 1954　　　　　　　　　　　　2 Sheets-Sheet 2
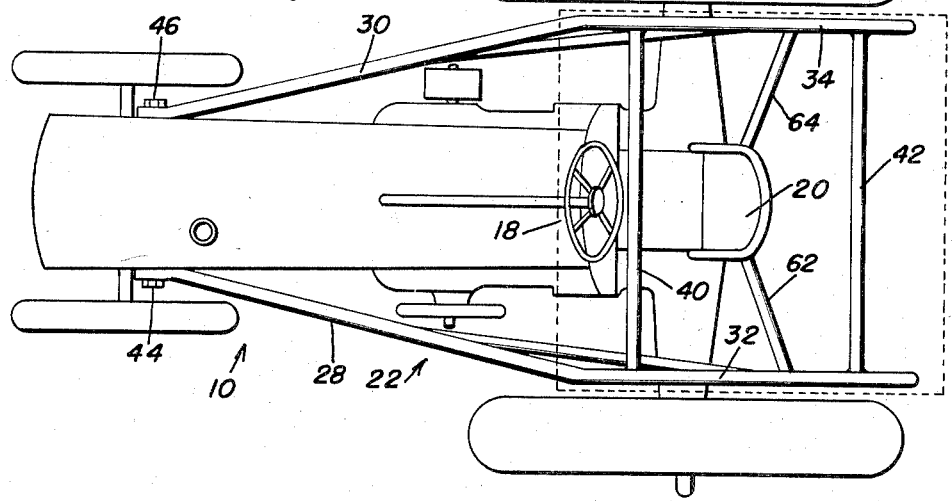
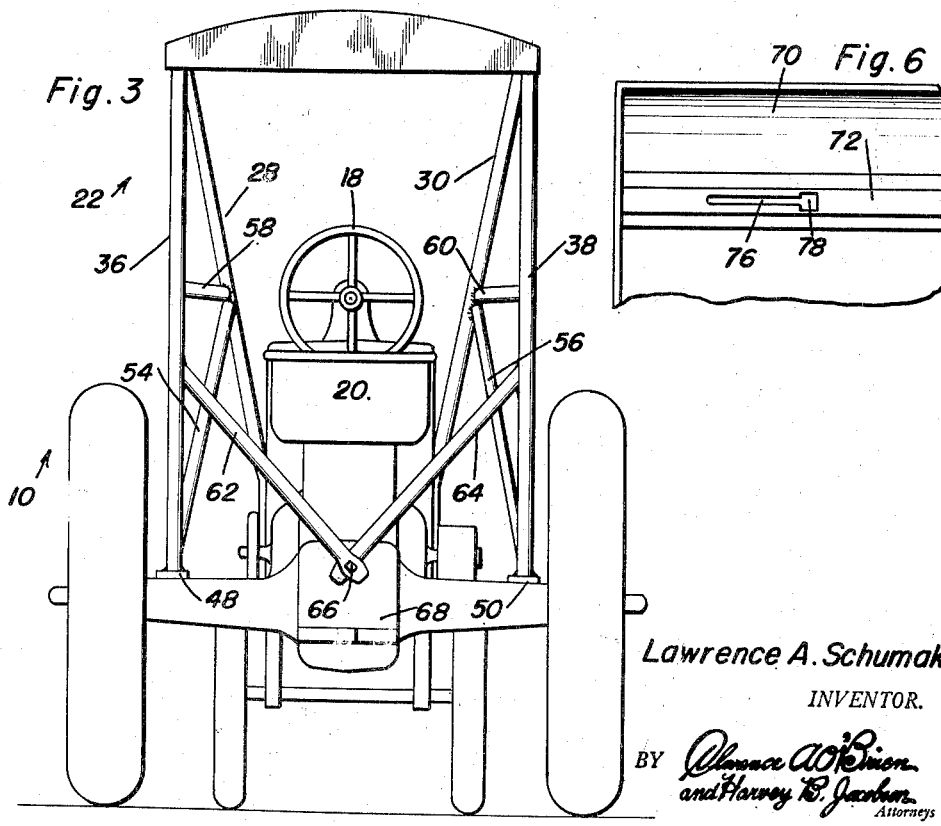
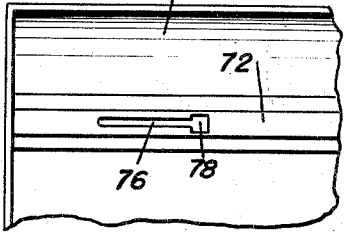
Lawrence A. Schumaker
INVENTOR.

United States Patent Office 2,785,002
Patented Mar. 12, 1957

2,785,002

SAFETY FRAME AND TOP FOR TRACTOR

Lawrence A. Schumaker, Boonville, Mo.

Application July 26, 1954, Serial No. 445,833

2 Claims. (Cl. 296—102)

This invention relates to a combined safety frame and canopy for use on a tractor or like vehicle and has as its particular object the provision of means for reducing the possibility of death or injury to an operator of a tractor should the tractor roll over or slip backwards in a manner that without this safety device a good possibility exists that the operator of the tractor would be crushed by the weight of the tractor.

A further object of the invention resides in the provision of a safety device for a tractor which may be easily attached and detached from any of the various makes and models of conventional tractors and which employs a removable canopy which may be utilized during inclement or hot weather.

Yet another object of the invention resides in the provision of a safety frame and top for a tractor which is exceedingly simple in construction and installation, yet which is capable of providing maximum protection to the operator of the vehicle by being constructed in such manner that the greatest protection is positioned immediately overhead the usual position of the operator.

The construction of this invention especially features two substantially U-shaped frame members having leg portions which extend upwardly and rearwardly from their securing place on the tractor. These frames provide supports for arcuate transverse members which support the canopy in a detachable manner. Further, the U-shaped frame members have their upper portions arcuately curved so as to be resistant against cracking or breaking at these portions should an accident to the tractor occur.

Still further objects and features of this invention reside in the provision of a safety frame and top for a tractor or like vehicle that is strong and durable, simple in construction and installation, inexpensive to manufacture, and adaptable within the concept thereof to be made from various types and materials such as angle-iron, bars, tubes, rods, or the like.

These, together with the various ancillary objects and features of the invention which will become apparent as the following description proceeds, are attained by this safety frame and top for a tractor, a preferred embodiment of which has been illustrated in the accompanying drawings, by way of example only, wherein:

Figure 1 is a side elevational view illustrating the device comprising the present invention as operatively installed on a tractor;

Figure 2 is a plan view illustrating the construction of the safety frame and illustrating the position of the canopy in phantom lines;

Figure 3 is a rear elevational view of the invention as installed on a tractor;

Figure 4 is a sectional detailed view as taken along the plane of line 4—4 in Figure 1 and illustrating the shape of the arcuate transverse members in greatest detail;

Figure 5 is a detailed sectional view as taken along the plane of line 5—5 in Figure 4 illustrating the construction of the clamp means utilized in securing the canopy to the transverse members; and Figure 6 is a partial bottom plan view illustrating the shape of the slots in the channel shaped members secured to the canopy.

With continuing reference to the accompanying drawings wherein like reference numerals designate similar parts throughout the various views, reference numeral 10 generally designates a tractor of any conventional make or model which is provided with a frame 12 as well as a rear axle 14 extending through an axle housing 16. Adjacent the steering wheel 18 of the tractor is a seat or support 20 for the operator of the tractor 10.

When the tractor 10 is utilized in hilly terrain there is the possibility that the tractor 10 will topple over on its side or will tip over backwards due to the slope of the terrain. This causes severe injury and death to many farmers and in order to avoid the consequences of the rolling over of the tractor or the tipping backwards thereof, the combined safety frame and canopy comprising the present invention and generally designated by reference numeral 22 is provided.

The combined safety frame and canopy 22 includes a pair of substantially U-shaped side frame members 24 and 26. The U-shaped frame members 24 and 26 include a pair of front upwardly, rearwardly, and diverging legs 28 and 30 which are interconnected by upper connecting portions 32 and 34 with angularly upwardly and rearwardly extending rear legs 36 and 38.

It is noted that the connecting portions 32 and 34 are provided with arcuate portions at their junctures with the respective legs 28 and 36, and 30 and 38. This increases the resistance of the frames 24 and 26 against cracking at these junctures or any other further injury to the safety device 22.

Welded or otherwise attached to the connecting portions 32 and 34 and extending therebetween are arcuate convex upwardly transverse members 40 and 42 which overly the seat 20 and steering wheel 18 of the tractor 10. The front legs 28 and 30 are adapted to be bolted as at 44 and 46 to the frame 12 of the tractor or various other types of tractors are made may be secured by suitable brackets attached to the frame 12 or other convenient place on the tractor 10. The rear legs 36 and 38 have plates 48 and 50 welded thereto which plates are adapted to be bolted as is indicated at 52 to the axle housing 16. A diagonally extending brace 54 extends between the leg 28 and the plate 48 while another diagonally extending brace 56 joins the plate 50 and the leg 30 for rigidifying the construction. Horizontally extending braces 58 and 60 are provided to interconnect the forward and rear leg portions for further rigidifying the construction. Diagonally extending braces 62 and 64 are secured to the legs 36 and 38 and are further secured by a bolt 66, or other suitable fastener to the transmission housing 68 of the tractor 10.

Supported by the transverse members 40 and 42 is an arcuate top plate 70 formed of sheet metal, or any other suitable material. This top plate 70 is convex upwardly and has welded or otherwise attached thereto a pair of channel shaped members 72 and 74 each of which are provided with a pair of generally T-shaped slots as at 76 therein. The T-shaped slots 76 have an enlarged portion 78 for reception of the heads 80 of bolts which are used to clampingly hold flanged clamp members 82 which embrace the transverse members 40 and 42 to the channel members 72. Hence, utilizing the clamp members 82 the top plate 70 is clampingly held on the transverse members 40 and 42 and hence on the safety device 22. A peripheral flange 84 is provided for the top plate 70 and together with the top plate forms a canopy for the tractor.

The arcuate shape of the transverse members 40 and of the top plate 70 will tend to roll the tractor back onto its side or right side up should the tractor tip over. Further, this curved conformation will minimize damage to both the tractor and the safety device should the tractor tip over or roll over.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A combined safety frame and canopy for a tractor comprising a pair of spaced inverted substantially U-shaped frame members each having upwardly and rearwardly extending spaced legs interconnected by an upper connecting portion, spaced arcuate upwardly convex transverse members secured to and extending between the upper connecting portions of said U-shaped frame members, and a top plate detachably secured to and overlying said transverse members, said top plate being arcuate and upwardly convex in configuration, a pair of channel shaped members secured to said top plate and depending therefrom, clamps underlying said transverse members, slots in said channel members, and fasteners engaged in said slots extending through said clamps to clampingly secure said top plate to said transverse members.

2. A combined safety frame and canopy for a tractor comprising a pair of spaced inverted substantially U-shaped frame members each having upwardly and rearwardly extending spaced legs interconnected by an upper connecting portion, spaced arcuate upwardly convex transverse members secured to and extending between the upper connecting portions of said U-shaped frame members, and a top plate detachably secured to and overlying said transverse members, said top plate being arcuate and upwardly convex in configuration, a pair of channel shaped members secured to said top plate and depending therefrom, clamps underlying said transverse members, slots in said channel members, and fasteners engaged in said slots extending through said clamps to clampingly secure said top plate to said transverse members, and diagonally extending braces secured to said U-shaped frame members and adapted to be secured to a tractor for rigidifying said safety frame and canopy.

References Cited in the file of this patent

UNITED STATES PATENTS

| | | |
|---|---|---|
| 2,479,036 | Campbell | Aug. 16, 1949 |
| 2,486,734 | Campbell | Nov. 1, 1949 |
| 2,556,062 | Buehrig | June 5, 1951 |
| 2,606,788 | Dieterich | Aug. 12, 1952 |

FOREIGN PATENTS

| | | |
|---|---|---|
| 603,466 | France | Apr. 16, 1926 |
| 622,899 | France | June 9, 1927 |
| 637,275 | Great Britain | May 17, 1950 |